March 2, 1965 C. J. PARTON 3,171,516
BRAKE SHOE AND FRICTION PAD ASSEMBLY
Original Filed Oct. 28, 1960 2 Sheets-Sheet 1
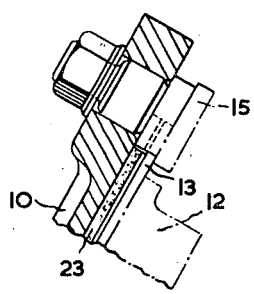
FIG.2.
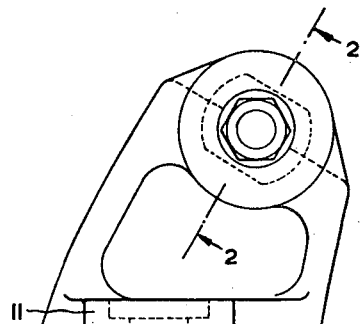
FIG.1.
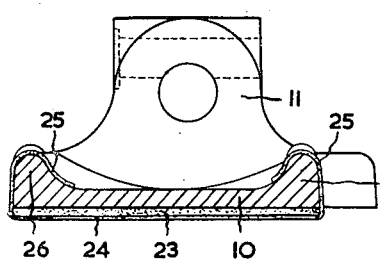
FIG.4.
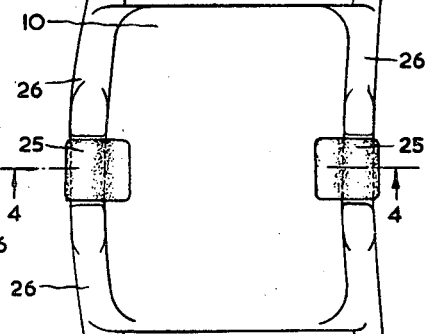
FIG.3.
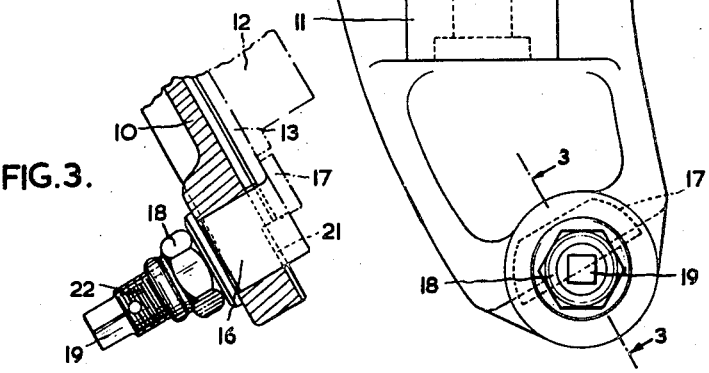
Clifford J. Parton Inv.
by Scrivener & Parker Attys

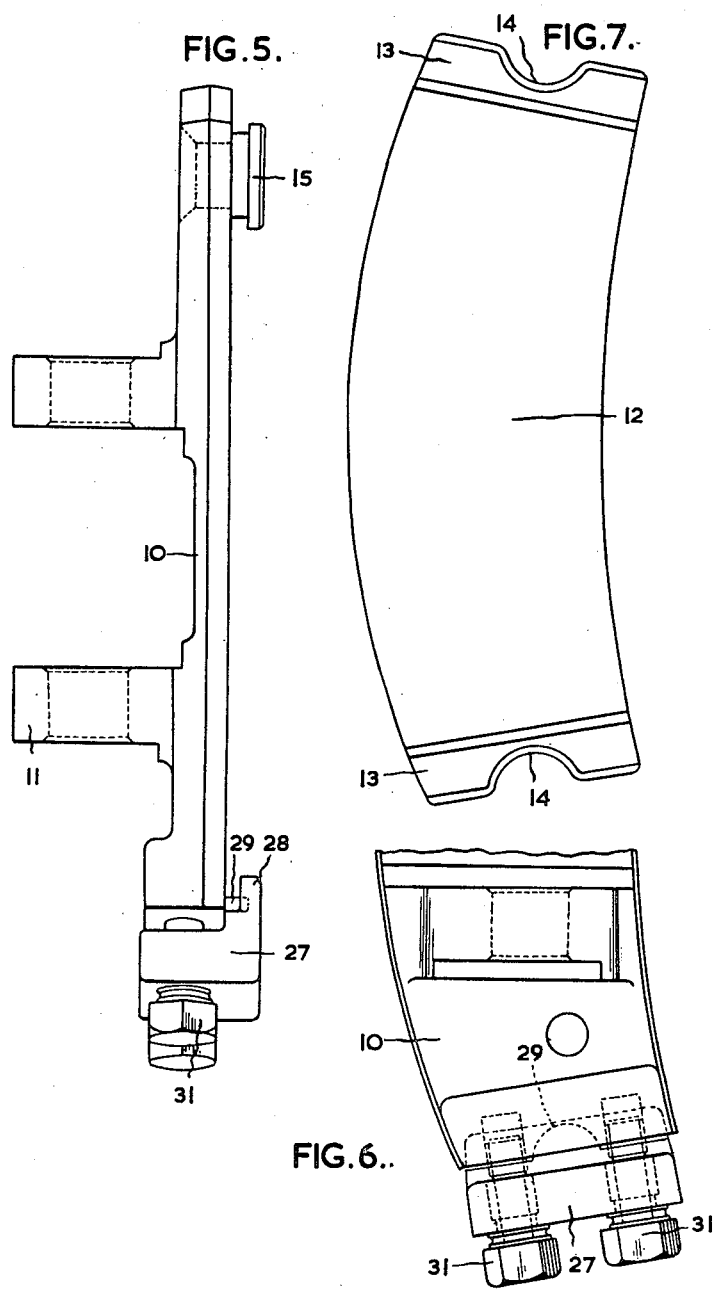

United States Patent Office 3,171,516
Patented Mar. 2, 1965

3,171,516
BRAKE SHOE AND FRICTION PAD ASSEMBLY
Clifford John Parton, Yardley, Birmingham, England, assignor to Girling Limited, Tyseley, Birmingham, England, a British company
Continuation of application Ser. No. 65,810, Oct. 28, 1960.
This application Aug. 2, 1963, Ser. No. 302,760
8 Claims. (Cl. 188—234)

This invention relates to improvements in brakes of the kind in which at least one friction pad is adapted to be brought into engagement with a co-operating face of a brake disc or drum or other moving surface, and is carried by a brake shoe mounted in such a manner as to bring the friction pad and the co-operating surface into contact with one another.

My invention is particularly concerned with the mounting of the friction pads on the brake shoes and one object of our invention is to facilitate the fitting and removal of the friction pads particularly where the space available is limited.

According to my invention, in a brake of the kind set forth above, a friction pad is bonded or otherwise secured to a rigid metal backing plate having at one end a notch adapted to engage under a head, flange or the like on a projection on the face of the brake shoe, whilst the other end of the backing plate is urged against the shoe by a keeper which can be displaced or removed to allow the friction pad and backing plate to be removed in a direction substantially parallel to the face of the shoe.

The invention is particularly applicable to brakes for rail vehicles of the type in which the friction pads adapted to engage opposite faces of a brake disc or of a wheel are carried by brake shoes mounted on the inner ends of caliper levers which are pivoted on a yoke or the like and are separated at their outer ends by mechanical or fluid pressure means to bring the friction pads into engagement with the disc or wheel.

Conveniently the notch is semi-circular and engages under the head of a stud projecting from the shoe. The other end of the backing plate may be similarly notched.

Two forms of friction pad mounting in accordance with my invention are illustrated by way of example in the accompanying drawings in which:

FIGURE 1 is a rear elevation of one form of brake shoe;

FIGURES 2, 3 and 4 are sections on the lines 2—2, 3—3 and 4—4 of FIGURE 1 respectively;

FIGURE 5 is a side elevation of another form of shoe without the friction pad;

FIGURE 6 is a rear elevation of the lower end of the shoe shown in FIGURE 5; and FIGURE 7 is a front elevation of the friction pad for the shoe shown in FIGURES 5 and 6; that for use with the shoe of FIGURES 1 to 4 is similar.

In the construction shown in FIGURES 1 to 4, the brake shoe 10 is an arcuate member having a flat front face to receive a friction pad and having on its rear face spaced lugs 11 to receive pins by which it is pivotally attached to a caliper lever.

The friction pad is of the general outline shown in FIGURE 7, and comprises a pad 12 of friction material bonded or otherwise secured to an arcuate backing plate 13 adapted to fit against the front face of the shoe.

The upper end of the backing plate, in which is formed a semi-circular notch 14, is adapted to be engaged under a headed stud 15 fixed in the shoe at one end and projecting from its front face, as shown in section in FIGURE 2, the radius of the notch being the same as that of the portion of the stud below the head so that the backing plate is located against transverse movement on the shoe as well as being held or restrained against axial movement away from the shoe. The other end of the backing plate, which is formed with a similar notch 14, is engaged with and retained by the keeper shown in section in FIGURE 3. The keeper comprises a pin 16 mounted in the shoe for angular and axial movement and having its axis at right angles to the face of the shoe. The forward end of the pin has an arcuate offset head 17 adapted to engage over the backing plate 13, the notch 14 fitting against the pin below the head, and the rear end of the pin which projects from the rear of the shoe is screw-threaded to receive a nut 18 and is squared or otherwise formed at its extremity 19 to receive a tool for moving the pin angularly. On the outer side of the pin, the front face of the shoe is cut away, as shown at 21 in FIGURE 3, to a depth sufficient to allow the offset head 17 of the pin to stand below the level of the back face of the backing plate.

In the normal position of the keeper, the head 17 of the pin engages over the adjacent portion of the backing plate on the inner side of the pin, as shown in FIGURES 1 and 3, and tightening the nut 18 causes the head to clamp the backing plate against the face of the shoe, the backing plate then being effectively located against movement in any direction relative to the shoe.

To release the backing plate, the nut 18 is slackened and the pin 16 is turned through 180° to swing the head 17 clear of the backing plate. The pin is then retracted to draw the head 17 into the cut-away portion 21 of the shoe so that the forward face of the head is flush with the face of the shoe and the backing plate and pad can be withdrawn in a direction parallel to the face of the shoe, the other end of the backing plate sliding out from under the headed stud 15.

The metal of the backing plate may be chamfered off around the notches 14 to facilitate the engagement of the one end under the pin 15 and the engagement of the head 17 over the other end.

The nut 18 may be a self-locking nut or a separate locknut may be provided, and a split pin 22 may be passed through a transverse hole drilled in the pin to prevent complete removal of the nut.

FIGURES 1 to 4 show a resilient pad 23 located between the backing plate 13 and the face of the shoe. This pad is retained on the shoe by a thin steel retaining plate 24 having curved tabs 25 which snap into gaps or notches in stiffening ribs 26 on the rear surface of the shoe as shown in FIGURE 4.

In the alternative construction shown in FIGURES 5 and 6, one end of the backing plate 13 of the friction pad is notched and engages under a headed stud 15 as in the construction described above. The other end of the backing plate is retained by a detachable keeper comprising a plate or block 27 having on its inner edge at the front a projecting lip or flange 28 adapted to engage over the adjacent end of the backing plate, there being on the face of the lip or flange next to the shoe a part-cylindrical projection or boss 29 engaging in the notch in the end of the backing plate. The plate or block is secured to the end of the shoe by screws or bolts 31 passing through the plate or block and screwed into tapped holes in the end of the shoe. The screws or bolts are preferably captive in the plate or block to prevent them from being removed and mislaid. On removal of the plate or block the backing plate and friction pad can be slid off the shoe in a direction parallel to the face of the shoe.

This application is a continuation of my prior application Serial No. 65,810, filed October 28, 1960, now abandoned.

I claim:

1. A brake shoe and friction pad assembly for a brake comprising a rigid brake shoe having a plane front face, a rigid metal backing plate having a plane rear face for sliding engagement with the front face of the shoe, a friction pad mounted on the front face of the backing plate, a first notch in one end of the backing plate, a headed member which projects from the face of the shoe and under which the said notch is adapted to be engaged by a sliding movement of the backing plate on the shoe, a second notch in the other end of the backing plate, and a releasable keeper mounted on the shoe comprising a pin mounted in the brake shoe adjacent to one end thereof for axial and angular movement, the axis of the pin being at right angles to the face of the shoe, an off-set head on said pin adapted in one angular position of the pin to engage over the backing plate, and a cut away portion of the shoe on the outer side of the pin into which said off-set head can be retracted by axial movement of the pin rearwardly when in another angular position, said keeper including fastening means for connecting said keeper to said shoe, said fastening means being operable to permit movement of said keeper into its retracted position wherein said head is clear rearwardly of the plane front surface of the shoe whereby the backing plate can be withdrawn from the shoe by a sliding movement parallel to the surface of the shoe and in a direction away from the headed member.

2. A brake shoe and friction pad assembly as in claim 1, wherein said pin in the first mentioned angular position is received in the second recess in the backing plate.

3. A brake shoe and friction pad assembly as in claim 1, wherein said pin is screw-threaded at its rear end to receive a nut for moving the pin axially to cause the offset head to clamp the backing plate against the shoe, and the extremity of the pin is shaped to receive a tool for moving the pin angularly.

4. A brake shoe and friction pad assembly as in claim 1, wherein said first and second recesses in the backing plate are semi-circular.

5. A brake shoe and friction pad assembly for a brake comprising a rigid brake shoe having a plane front face, a rigid metal backing plate having a plane rear face adapted for sliding engagement with the front face of the brake shoe, said backing plate having a front face carrying a friction pad, a notch in one end part of the backing plate, a locating member for the backing plate rigidly secured to the brake shoe and projecting from the front face thereof, said locating member comprising a shank portion with which said notch in said one end part is complementarily engaged to positively locate said end part against transverse movement with respect to said shoe, and a headed portion spaced a predetermined distance from said front face to restrain axial movement of the end part of the backing plate away from said shoe, a keeper part adjacent the opposite end part of said backing plate, one of said last named parts including a notch and the other of said parts including a projection complementarily engaged with said notch to prevent transverse movement of said opposite end part with respect to said shoe said keeper part including a portion projecting over the end part of said shoe to restrain said opposite end part against axial movement away from said shoe, and releasable means rigidly securing said keeper means to said shoe and being operable to permit movement of said keeper means to a position entirely clear of the plane front face of the shoe.

6. A brake shoe and friction pad assembly for a brake, comprising a rigid brake shoe having a plane front face, a rigid metal backing plate having a plane rear face adapted for sliding engagement with the front face of the brake shoe, said backing plate having a front face carrying a friction pad, a notch in one end of the backing plate, a locating member for the backing plate rigidly secured to said brake shoe and projecting from the front face thereof, said locating member comprising a shank portion with which said notch in said backing plate is complementarily engaged to positively locate said end part against transverse movement with respect to said shoe, and a headed portion spaced a predetermined distance from said front face to restrain axial movement of the end of the backing plate away from said shoe, a notch at the opposite end of said backing plate, keeper means co-operating with said notch and including a portion engaging said notch for preventing transverse movement of said other end of said backing plate with respect to said shoe and including another portion overlying said backing plate to restrain axial movement of said other end away from said shoe, and releasable means rigidly securing said keeper means to said shoe and being operable to permit movement of said keeper means to a position entirely clear of the plane forward face of the shoe.

7. The brake shoe and friction pad assembly of claim 6 wherein said shank is circular in cross-section and wherein said first notch is part circular and complementary in size with said shank.

8. A brake shoe and friction pad assembly for a brake, comprising a rigid brake shoe having a plane front face, a rigid metal backing plate having a plane rear face adapted for sliding engagement with the front face of the brake shoe, said backing plate having a front face carrying a friction pad, a pair of similar part-circular notches in the opposite ends of the backing plate, a rigid locating member for the backing plate projecting from the forward surface of the brake shoe, said locating member comprising a circular shank portion with which one of said part-circular notches in said backing plate is complementarily engaged to prevent transverse movement of said backing plate with respect to said shoe, and a headed portion spaced a predetermined distance from said front face to restrain axial movement of the end of the backing plate away from said shoe, a keeper having a part complementarily engaged with the second part-circular notch and a second part engaged over said backing plate adjacent to said second notch, said first and second parts being adapted respectively to prevent transverse movement and to restrain axial movement of said other end of said backing plate with respect to said shoe, and releasable means rigidly securing said keeper to said shoe and being operable to permit movement of said keeper to a position wherein the first and second parts thereof are entirely clear of the plane forward face of the shoe whereby said backing plate is movable into and out of its position of use towards and away from said locating member and solely parallel to the front face of said shoe.

References Cited by the Examiner

UNITED STATES PATENTS

| | | | |
|---|---|---|---|
| 1,839,510 | 1/32 | Thompson | 188—240 |
| 2,451,326 | 10/48 | Eksergian et al. | 188—59 X |
| 2,848,076 | 8/58 | Davis | 188—244 |

ARTHUR L. LA POINT, *Primary Examiner.*